Jan. 20, 1970   J. L. A. SEE   3,490,190
COMPOSITE TUBE STRUCTURE
Filed Jan. 26, 1968   2 Sheets-Sheet 1
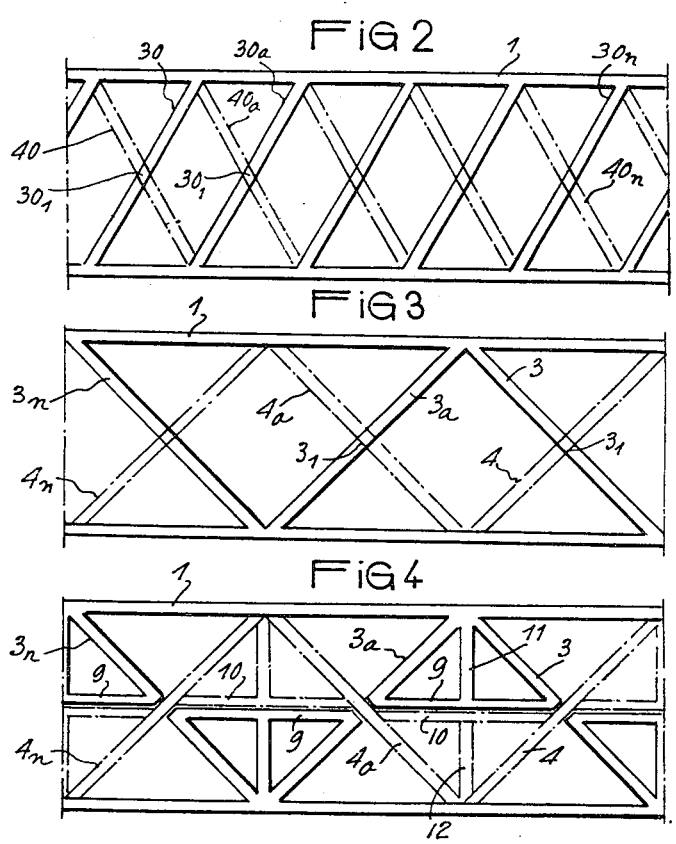
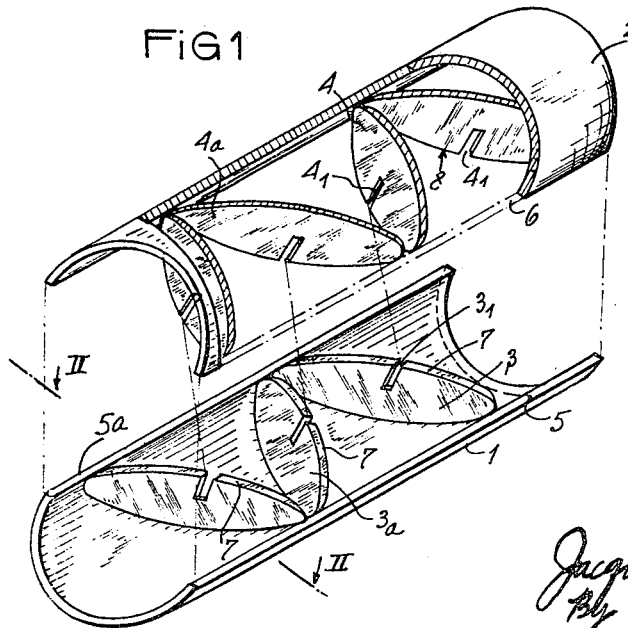

United States Patent Office 3,490,190
Patented Jan. 20, 1970

3,490,190
COMPOSITE TUBE STRUCTURE
Jacques Léon Alexandre See, Paris, France, assignor to Rador S.A., Luxemburg, Luxemburg, a company of Luxemburg
Filed Jan. 26, 1968, Ser. No. 700,993
Claims priority, application France, Jan. 27, 1967, 92,813
Int. Cl. E04c *3/36, 5/07*
U.S. Cl. 52—730                                    11 Claims

ABSTRACT OF THE DISCLOSURE

A composite tube structure made by assembling two complementary half-pieces, each one internally provided with discoidal elements sloped with respect to the axis of each half-piece, and protruding correspondingly to the depth of the other corresponding half-pieces, and each one of the discoidal elements, being provided with a cut so that when the two half-pieces of tube are assembled, the cuts of the corresponding discoidal elements are crossed coming into each other.

---

The present invention relates to a composite tube structure for scales, gangways, frame-works for scaffoldings, etc.

Up to now, when articles are to be realized from tube members, metallic tubes are used because of their mechanical properties allowing them to support important forces of flexion, torsion and compression. Such tubes have nevertheless some drawbacks particularly they are heavy and corrosion sensitive, whereby it is necessary to submit those tubes to various protecting operations.

Incidentally, it was not possible, up to now to economically make tubes of synthetic resins, particularly of thermoplastic synthetic resins, the mechanical strength of those materials being low, comparatively, to metals.

The present invention creates a new process for making tube parts allowing obviation of the drawbacks of synthetic resins while taking full advantage of their characteristics concerning particularly their appearance, their low cost, their working aptitude and their resistance to corrosion. While the invention relates more particularly to tubes made of synthetic resins it would be still part of the invention to make use of tubes made of metals, those tubes having, with the same weight of materials, mechanical properties highly increased comparatively with conventional tubes.

The tube piece of the invention comprises two pieces of a tube part characterized by two complementary half-pieces of tube in which are provided discoidal elements sloped with respect to the axis of each one of said tube piece and protruding correspondingly to the depth of each complementary half-piece of tube, said discoidal elements being provided with cuts and said two half-pieces of tube being so assembled that the discoidal elements are crossed with their cuts coinciding.

The invention lies also to the tube parts and tubes obtained by this process and, samely to elements making use of such tube parts or tubes.

For a better understanding of the present invention and to show how the same may be carried into effect, reference will now be made, by way of example, to the accompanying drawing in which:

FIGURE 1 is a perspective view, partly cut away of the constitutive elements of a tube part according to the invention.

FIGURE 2 is a plane view cut along line II—II of FIGURE 1 showing a particular embodiment of some elements of the tube part.

FIGURES 3, 4 and 5 are plane view similar to FIGURE 2 and showing variants of embodiment.

Figure 5:
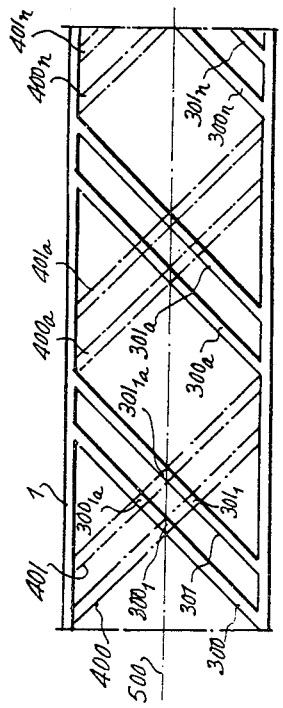

The tube part shown in FIG. 1 is made of two half-pieces of tube 1 and 2. Inside said half-pieces are placed discoidal elements 3, 3a . . . and 4, 4a, etc. The discoidal elements are obliquely placed with respect to the longitudinal axis of each half-piece of tube and correspondingly in both half-pieces 1 and 2. Moreover, as shown in the drawing, each discoidal element is provided with a cut $3_1$ and $4_1$, respectively, roughly extending up to the center of said element in such a manner to make possible to imbricate together by crossing the discoidal element 3 with the discoidal element 4, the discoidal element 3a with the discoidal element 4a, etc.

When the discoidal elements are imbricated, the side edges 5, 5a and 6, 6a of the tube half-pieces 1 and 2 are in contact with one another, while the free edge 7 of the discoidal elements 3, 3a, etc., comes in contact with the inside wall of the tube half-piece 2, so that the free edges 8 of the discoidal elements 4, 4a, etc., are coming in contact with the inside wall of the tube half-piece 1.

Preferentially, the tube half-pieces 1 and 2 are made together with their respective discoidal elements in synthetic resin, which can be done in various ways. Particularly each of the half-pieces may be moulded, the discoidal elements coming from moulding altogether with said tube half-pieces. Samely, it is possible to make by extrusion the tube half-pieces 1 and 2 and to separately manufacture the discoidal elements, either by moulding or cutting or heat forming.

At the moment of assembling the two half-pieces 1 and 2, at least the free walls 7 and 8 of the discoidal elements and the edges 5, 5a and 6, 6a of the half-pieces 1 and 2 are coated with a glue, a solvent or a not yet polymerized resin, so that after assembling, the whole assembly is jointly liable and forms only one piece. The liability may also be made, if desired, by other partly depending upon the nature of the material then used for making the two tube half-pieces and the discoidal elements. Particularly, it is posible to realize soldering, for example, by applying heat or ultasonics. In some cases, it is also possible to realize the tube part in a composite way, that is to say to realize the tube-pieces 1 and 2 in synthetic resin and the discoidal elements in other materials, for example, in metal.

When the tube-pieces 1 and 2 are made by extrusion and the discoidal elements are set in place only after making said tube-pieces, the discoidal elements may be armoured with reinforcement fibers, for example, with glass fibers.

FIGURES 2 to 5 show different embodiments of the discoidal elements.

According to FIG. 2, the tube half-piece 1 comprises, made in one piece with the discoidal elements 30, 30a ... 30n parallely placed each other and all having a cut $30_1$. Analogously, the discoidal elements 40, 40a ... 40n, represented in dash and dot line, are also placed parallely and their cut, which is not seen in the drawing, coincides with the cut $30_1$ of each discoidal element 30 to 30n. The drawing shows that an internal cross-bracing of the tube part is finally realized, which increases in a considerable manner the resistance to flexion as well as to torsion with regard to or tube of same diameter and same material but not comprising such discoidal elements.

According to FIG. 3, the discoidal elements are placed in an analogous manner as in FIG. 1, that is to say their elements 3 to 3n are in a folded line and the cuts $3_1$, provided in their median part. The representation in dash and dots line of the discoidal elements 4, 4a ... 4n belonging to the tube half-piece 2 and also disposed in a folded line shows that it is also realized an internal cross-bracing of the tube. It is to be noticed that said cross-bracing is formed in such a way that the discoidal elements are integral by all the periphery of each of the two tube half-pieces, thus the resistance to flexion particularly of the tube part finally obtained is uniform.

According to FIG. 4, the discoidal elements are formed in a way analogous to that above described in reference to FIG. 3, but, moreover, those discoidal elements are longitudinally joined by longitudinal parts 9, concerning the discoidal elements 3, 3a ... 3n and by longitudinal parts 10 concerning the discoidal elements 4, 4a ... 4n. Preferably, those longitudinal elements are extended to a height corresponing to the inside diameter of the tube part to be realized and they are slightly shifted relatively to the axis of the tube, in order that the elements 9 and 10 lean respectively the one against the other so to be then solidarized together by sticking, welding or other processes, in the same time as the two tube half-pieces. The presence of the longitudinal elements 9 and 10 considerably increases the resistance to compression of the terminated tube part, as well as the resistance to flexion when this flexion is exerted perpendicularly to the plane of said longitudinal elements 9, 10.

To better increase the resistance to flexion and also to torsion, small transverse bars 11 and 12 may also be provided to join the longitudinal elements 9 and 10, respectively, with the junction of the two discoidal elements such as 3, 3a and 4, 4a. The inside of the tube part is thus entirely provided with cells, said cells being roughly triangularly-shaped.

It is to be noticed that the realization of the longitudinal elements 9 and 10 does not complicate the making, principally when the tube half-piece and the discoidal elements are made simultaneously by moulding.

According to FIG. 5, the tube half-piece 1 comprises sets of at least two discoidal elements 300, 301, 300a, 301a ... 300n, 301n and, in analogous manner, the tube half-piece 2 which is not shown comprises corresponding sets of discoidal elements 400, 401, 400a, 401a ... 400n, 401n.

In this case, each discoidal elements comprises two cuts $300_1$, $300_{1a}$, $301_1$, $301_{1a}$ and evidently, the elements such as 400, 401 of the corresponding cuts. The drawing shows that, in this case, the cuts $300_1$ and $301_{1a}$ are necessarily in line with the axis 500 of the finished tube part, while contrarily the cuts $300_{1a}$ and $301_1$ are shifted relatively to said said axis 500. It results therefrom that it is impossible for the discoidal element, to pivoting along the axis 500 which constitutes the median line of the tube part, so that the resistance to flexion is increased, as well as the resistance to compression and to traction.

If desired, it may be provided more than two discoidal elements by set and samely, the discoidal element may indifferently be disposed as shown in FIG. 5 or as shown in FIG. 3, that is to say in folded line. Samely, the complementary means of FIG. 4 may also be put in use in the embodiment of FIG. 5.

Figure 6:
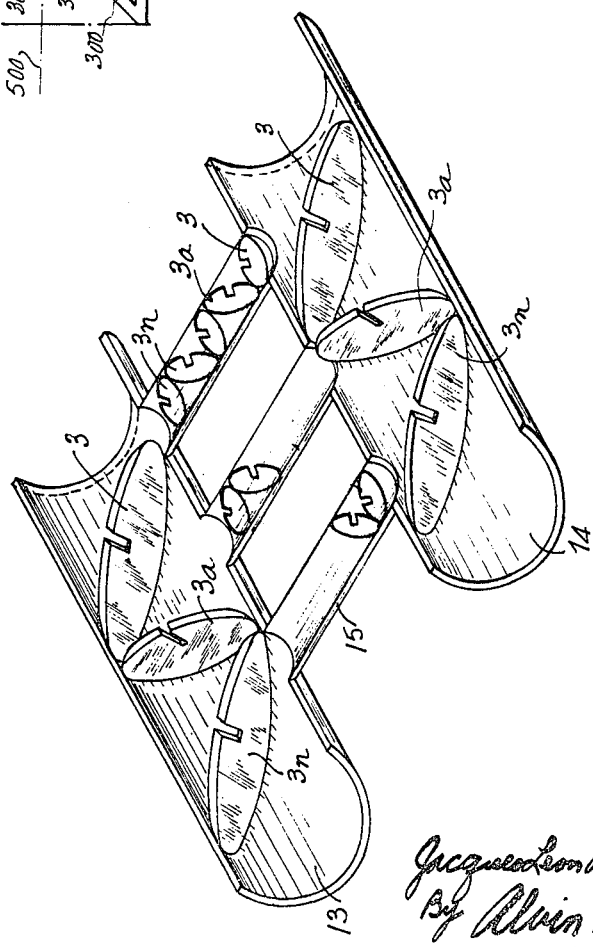
FIGURE 6 is a perspective view of a particular application of the invention.

FIGURE 6 shows an application of the invention to the making of a scale by means of two complementary half-shells, only one of which appears on FIG. 6, and which comprises two uprights 13 and 14 joined by crossbars 15. Both the uprights and the cross-bars comprise internaly provided discoidal elements 3, 3a ... 3n. The whole assembly of the half-shell of FIG. 6 may easily be made in one operation by molding, allowing to make in a particularly cheap way, extremely light, resistant and inalterable scales.

Various modifications of the invention are possible; particularly, the cross-section of the tube may be of any shape and it is only by way of example that it has been shown circular in the drawing since obviously the cross-section may be polygonal or oblong without going outside the scope of the invention.

I claim:

1. A composite, non-flexible tubular structure of high strength comprising:

two axially extending half tubes joined together along axially extending edges to form a tube;

a first series of disk-like elements located within said tube and each rigidly connected along substantially its entire periphery to the interior surfaces of both said half tubes, said first disk-like elements being inclined at an oblique angle from the axis of said tube;

and a second series of disk-like elements located within said tube and each rigidly connected along substantially its entire periphery to the interior surfaces of both said half tubes, said second disk-like elements being inclined at an oblique angle from the axis of said tube in an opposite direction to the inclination of said first disk-like elements, and each of said first disk-like elements intercrossing with one of said second disk-like elements along radially extending complementary cuts in said disk-like elements, whereby the joining of said half-tubes therebetween and with said intercrossing disk-like elements substantially prevents flexion upon stress.

2. A composite tube structure according to claim 1 characterized in that the half-pieces of tube and the disk-like elements are made of synthetic resin.

3. A composite tube structure according to claim 1 characterized in that each half-piece is formed to be rigidly connected to other half-piece thus forming two joinable half-scales and defining various objects as scales, gangways, the disk-like elements being formed in any of the part of said objects.

4. A composite tube structure according to claim 1 characterized in that said 1rst disk-like elements are parallel to each other and said second disk-like elements are parallel to each other, the cuts being provided in said disk-like elements extending approximately up to the center thereof.

5. A composite tube structure according to claim 4 characterized in that the disk-like elements are placed in saw cut.

6. A composite tube structure according to claim 4 characterized in that longitudinal elements are supplementarily provided to link together two by two the disk-like elements of each half-piece of tube.

7. A composite tube structure according to claim 6 characterized in that the longitudinal elements joined the disk-like elements of each half-piece of tube are shifted relatively to the longitudinal axis of said half-piece of tube, in such a manner that they lean against the corresponding longitudinal elements of the half-piece of the complementary tube.

8. A composite tube structure according to claim 6 characterized in that transverse lugs are provided to join the longitudinal elements to the internal wall of the half-pieces of tube.

9. A composite tube structure according to claim 6 characterized in that said disk-like elements are formed inside each half-piece of tube by set of at least two disk-like elements each one being provided with two cuts, one of those elements being thus shifted respectively to the longitudinal axis of the tube piece formed after assembling the two complementary half-pieces of tube.

10. A composite tube structure according to claim 6 characterized in that the disk-like elements are made in a different material than said half-pieces of tube.

11. A composite tube structure according ot claim 6 characterized in that the disk-like elements are made of metal.

References Cited

UNITED STATES PATENTS

| 2,013,242 | 9/1935 | Johns | 52—720 X |
| 2,554,167 | 5/1951 | Anderson | 138—37 X |
| 3,265,401 | 8/1966 | Spier | 52—720 X |
| 3,314,502 | 4/1967 | Thorn | 52—720 X |

FOREIGN PATENTS

| 596,132 | 4/1934 | Germany. |

FRANK L. ABBOTT, Primary Examiner

SAM D. BURKE III, Assistant Examiner